(12) United States Patent
Sullivan et al.

(10) Patent No.: US 9,020,350 B2
(45) Date of Patent: Apr. 28, 2015

(54) OPTICAL SPECTRUM RECOVERY

(75) Inventors: Edward T Sullivan, Highland Village, TX (US); Hal Kauffeldt, Plano, TX (US)

(73) Assignee: TechSys Insights, Plano, TX (US)

( * ) Notice: Subject to any disclaimer, the term of this patent is extended or adjusted under 35 U.S.C. 154(b) by 791 days.

(21) Appl. No.: 13/168,811

(22) Filed: Jun. 24, 2011

(65) Prior Publication Data

US 2012/0328296 A1    Dec. 27, 2012

(51) Int. Cl.
*H04J 14/02*    (2006.01)

(52) U.S. Cl.
CPC ......... *H04J 14/0212* (2013.01); *H04J 14/0204* (2013.01); *H04J 14/0205* (2013.01); *H04J 14/021* (2013.01); *H04J 14/0257* (2013.01); *H04J 14/0275* (2013.01); *H04J 14/026* (2013.01); *H04J 14/0279* (2013.01)

(58) Field of Classification Search
USPC .......................................................... 398/79
See application file for complete search history.

(56) References Cited

U.S. PATENT DOCUMENTS

| | | | |
|---|---|---|---|
| 5,144,467 A | 9/1992 | Kitajima et al. |
| 5,319,485 A | 6/1994 | Yasui et al. |
| 5,471,332 A | 11/1995 | Shiragaki et al. |
| 5,999,288 A | 12/1999 | Ellinas et al. |
| 6,038,357 A | 3/2000 | Pan |
| 6,407,846 B1 | 6/2002 | Myers et al. |
| 6,411,411 B1 | 6/2002 | Okazaki et al. |
| 6,583,901 B1 | 6/2003 | Hung |
| 6,587,239 B1 | 7/2003 | Hung |
| 6,618,176 B2 | 9/2003 | Alexander et al. |
| 6,661,973 B1 | 12/2003 | Huber et al. |
| 6,748,134 B2 | 6/2004 | Bigo et al. |
| 6,885,822 B1 | 4/2005 | Chin et al. |
| 7,081,985 B2 | 7/2006 | Phillips |
| 7,113,702 B2 | 9/2006 | Yamada et al. |
| 7,209,664 B1 | 4/2007 | McNicol et al. |
| 7,317,728 B2 | 1/2008 | Acharya et al. |
| 7,343,100 B2 | 3/2008 | Yao |
| 7,369,780 B2 | 5/2008 | Alexander et al. |
| 7,391,720 B1 | 6/2008 | Kuditipudi et al. |
| 7,424,223 B1 | 9/2008 | Lundquist et al. |
| 7,483,629 B2 | 1/2009 | Weston-Dawkes et al. |

(Continued)

FOREIGN PATENT DOCUMENTS

WO    WO 02-80453 A2    10/2010

OTHER PUBLICATIONS

Patel et al., "Defragmentation of Transparent Flexible Optical WDM (FWDM) Networks", OSA/OFC/NFOEC 2011, Mar. 6-10, 2011.*

(Continued)

*Primary Examiner* — Shi K Li

(57) ABSTRACT

The invention is directed to systems and methods for re-arranging optical spectrum utilization so that unallocated portions of the spectrum may be made contiguous. Rearrangement of optical spectrum is accomplished by moving a channel from its initial spectral location to a targeted spectral location by reserving additional spectrum for that channel that at least includes the targeted spectral location, shifting the channel to the targeted location and then collapsing the reserved spectrum around the targeted location to cover the minimal required spectrum for the channel allocation of the channel. In some cases, a secondary channel can be used as an alternate source to carry user traffic while the first channel is shifted to the targeted location.

7 Claims, 12 Drawing Sheets

(56) References Cited

U.S. PATENT DOCUMENTS

| | | | |
|---|---|---|---|
| 7,532,653 | B2 | 5/2009 | Anderson et al. |
| 7,796,887 | B2 | 9/2010 | Terahara et al. |
| 7,885,186 | B2 | 2/2011 | McLean et al. |
| 2007/0172237 | A1* | 7/2007 | Risbood .......................... 398/59 |
| 2008/0024788 | A1 | 1/2008 | Shimizu et al. |
| 2008/0159742 | A1 | 7/2008 | Krishnaswamy et al. |
| 2009/0219608 | A1 | 9/2009 | Murai |
| 2010/0027561 | A1 | 2/2010 | Greborio et al. |
| 2010/0173586 | A1 | 7/2010 | McHenry et al. |

OTHER PUBLICATIONS

Hunter, D. K. and Marcenac, D. (2000). "Dynamic routing, rearrangement, and defragmentation in WDM ring networks." 2000 Optical Fiber Communication Conference (OFC) 1: 168-170 vol. 1.

Patel, A. N., JI, P. N., et al. "Defragmentation of transparent Flexible optical WDM (FWDM) networks." 2011 Optical Fiber Communication Conference and Exposition and the National Fiber Optic Engineers Conference (OFC/NFOEC): 1-3.

Gangxiang, S. and Qi, Y. "From coarse grid to mini-grid to gridless: How much can gridless help contentionless?" 2011 Optical Fiber Communication Conference and Exposition and the National Fiber Optic Engineers Conference (OFC/NFOEC): 1-3.

Jinno, M., Takara, H., et al. (2009). "Spectrum-efficient and scalable elastic optical path network: architecture, benefits, and enabling technologies." IEEE Communications Magazine 47(11): 66-73.

Jinno, M., Ohara, T., et al. "Introducing elasticity and adaptation into the optical domain toward more efficient and scalable optical transport networks." 2010 ITU-T Kaleidoscope: Beyond the Internet?—Innovations for Future Networks and Services: 1-7.

Jinno, M., Takara, H., et al. (2009). "Dynamic optical mesh networks: Drivers, challenges and solutions for the future." 2009 35th European Conference on Optical Communication (ECOC): 1-4.

Jinno, M. and Tsukishima, Y. (2009). "Virtualized optical network (VON) for agile cloud computing environment." 2009 Conference on Optical Fiber Communication—incudes post deadline papers (OFC): 1-3.

Jinno, M., Takara, H., et al. (2008). "Demonstration of novel spectrum-efficient elastic optical path network with per-channel variable capacity of 40 Gb/s to over 400 Gb/s." 2008 34th European Conference on Optical Communication (ECOC): 1-2.

Jinno, Masahiko, Takara, Hidehiko, et al. (2009). "Concept and enabling technologies of spectrum-sliced elastic optical path network (SLICE)." 2009 Asia Communications and Photonics Conference and Exhibition (ACP): 1-2.

Takagi, T., Hasegawa, H., et al. "Algorithms for maximizing spectrum efficiency in elastic optical path networks that adopt distance adaptive modulation." 2010 36th European Conference and Exhibition on Optical Communication (ECOC), : 1-3.

Takara, H., Kozicki, B., et al. "Distance-adaptive super-wavelength routing in elastic optical path network (SLICE) with optical OFDM." 2010 36th European Conference and Exhibition on Optical Communication (ECOC): 1-3.

Takara, H., Kozicki, B., et al. "Spectrally-efficient elastic optical path networks." 2010 15th OptoeElectronics and Communications Conference (OECC): 116-117.

Christodoulopoulos, K., Tomkos, I., et al. "Spectrally/bitrate flexible optical network planning." 2010 36th European Conference and Exhibition on Optical Communication (ECOC): 1-3.

Christodoulopoulos, K., Tomkos, I., et al. "Routing and Spectrum Allocation in OFDM-Based Optical Networks with Elastic Bandwidth Allocation." 2010 IEEE Global Telecommunications Conference (GLOBECOM): 1-6.

Christodoulopoulos, K., Tomkos, I., et al. "Dynamic bandwidth allocation in flexible OFDM-based networks." 2011 Optical Fiber Communication Conference and Exposition and the National Fiber Optic Engineers Conference (OFC/NFOEC): 1-3.

Nag, A., Tornatore, M., et al. (2009). "Optical network design with mixed line rates and multiple modulation formats." 2009 Optical Fiber Communication—incudes post deadline papers (OFC): 1-3.

Gençata, A. (2003). "Topology and bandwidth adaptation in optical WDM backbone networks with dynamic traffic." PHD Thesis—Istanbul Technical University, Institute of Sciences and Technology, Apr. 2003.

Yonenaga, K., Inuzuka, F., et al. (2009). "Bit-rate-flexible all-optical OFDM transceiver using variable multi-carrier source and DQPSK/DPSK mixed multiplexing." 2009 Conference on Optical Fiber Communication—incudes post deadline papers (OFC): 1-3.

Ryf, R., Su, Y., et al. (2005). "Wavelength blocking filter with flexible data rates and channel spacing." Journal of Lightwave Technology 23(1): 54-61.

Wei, Z., Yaohui, J., et al. "On the spectrum-efficiency of bandwidth-variable optical OFDM transport networks." 2010 Conference on Optical Fiber Communication and collocated National Fiber Optic Engineers Conference (OFC/NFOEC): 1-3.

Klekamp, A., Rival, O., et al. "Transparent WDM network with bitrate tunable optical OFDM transponders." 2010 Conference on Optical Fiber Communication (OFC) and collocated National Fiber Optic Engineers Conference (OFC/NFOEC): 1-3.

Riezenman, M.J. (2002). "Optical nets brace for even heavier traffic." IEEE Spectrum 38(1): 44-46.

Zervas, G. S., Zarris, G., et al. "Experimental demonstration of a self-optimised multi-bit-rate optical network." 2010 36th European Conference and Exhibition on Optical Communication (ECOC): 1-3.

Homa, J. and Bala, K. (2008). "ROADM Architectures and Their Enabling WSS Technology." IEEE Communications Magazine 46(7): 150-154.

Guanjun, G., Jie, Z, et al. "Dynamic power control for mixed line rate transparent wavelength switched optical networks." 2010 36th European Conference and Exhibition Optical Communication (ECOC): 1-3.

Strasser, T. A. and Taylor, J. (2008). "ROADMS Unlock the Edge of the Network." IEEE Communications Magazine 46(7): 146-149.

Meyer, S. (2002). "Quantification of wavelength contention in photonic networks with reach variation." 2002 Optical Fiber Communication Conference and Exhibit (OFC): 36-38.

\* cited by examiner

Expanding

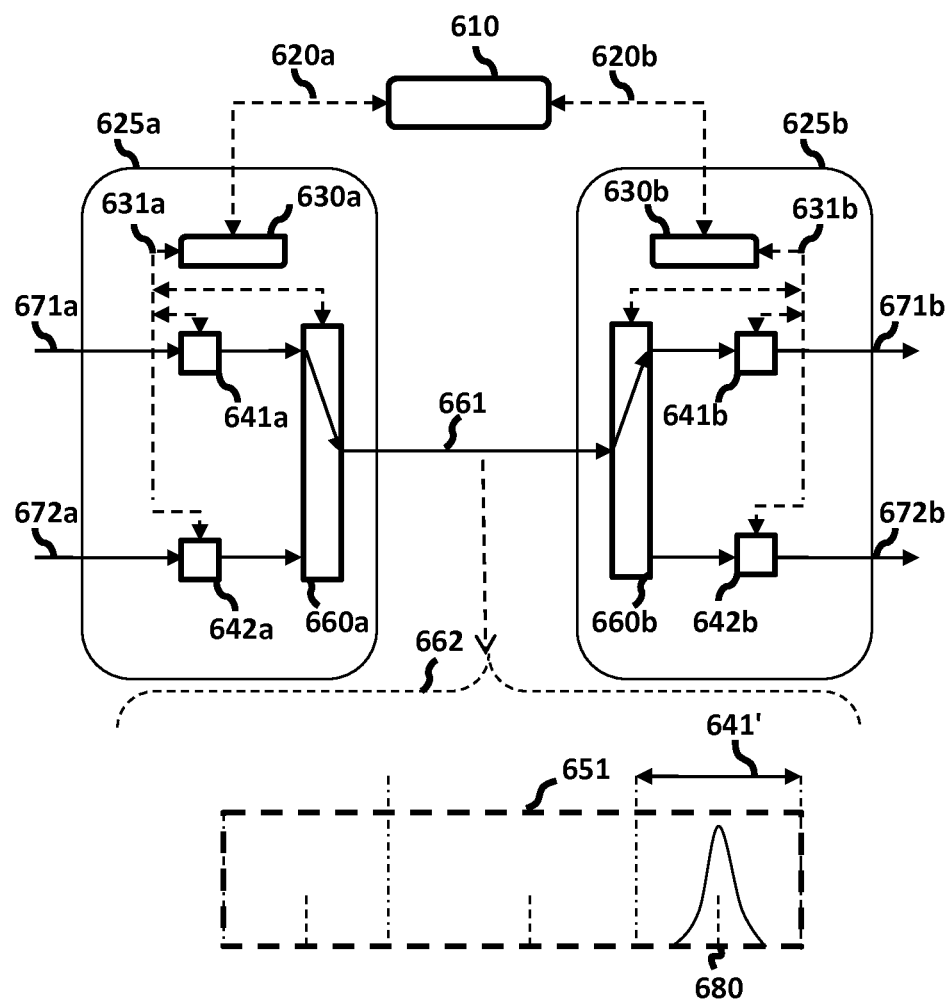

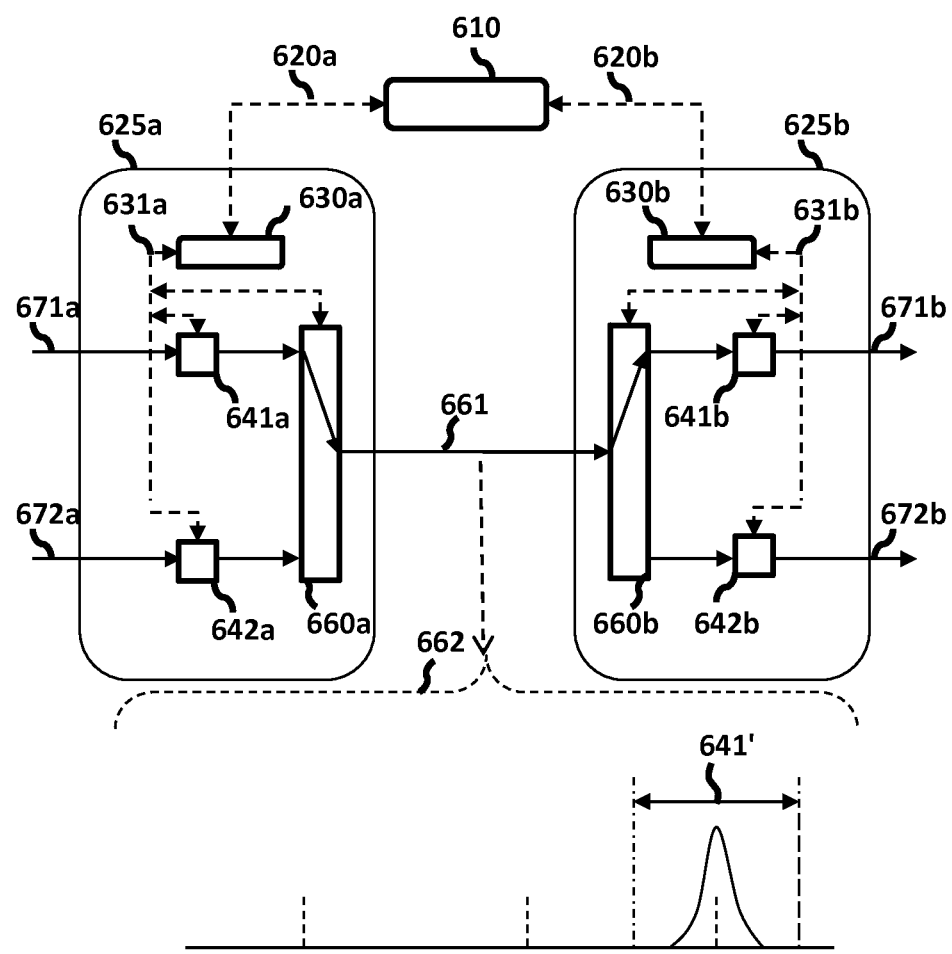

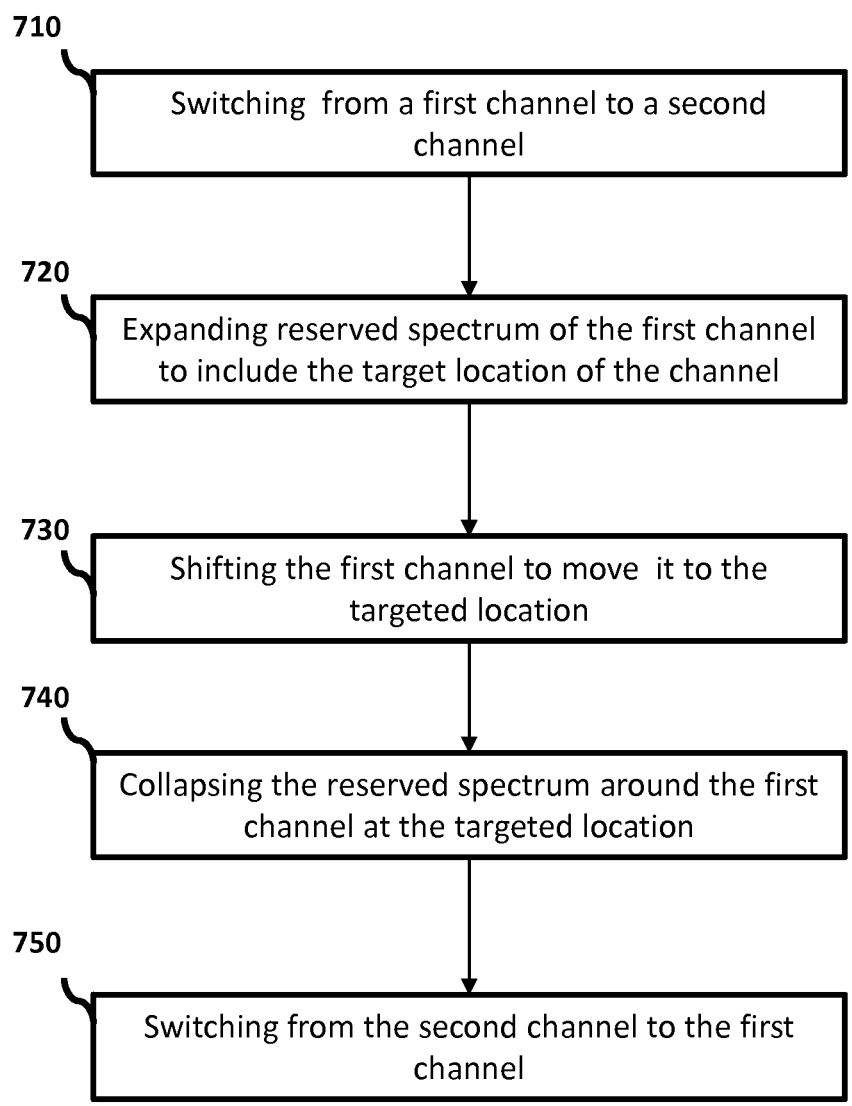

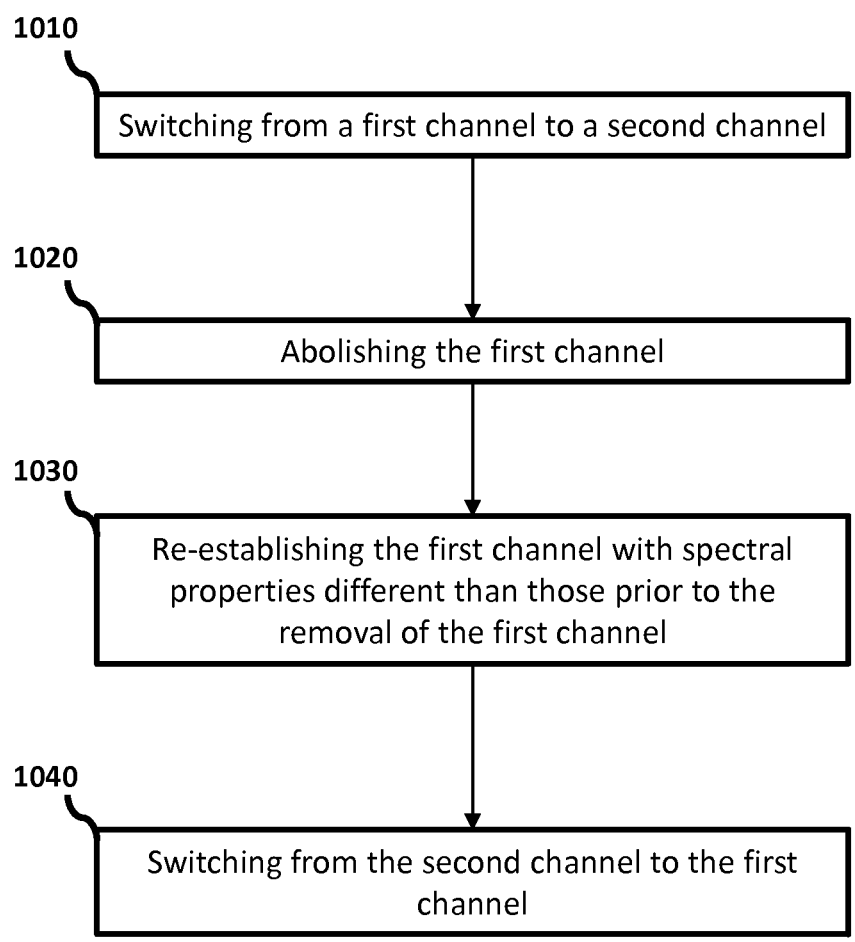

OPTICAL SPECTRUM RECOVERY

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Optical communication systems often employ Wavelength Division Multiplexing (WDM) with channel plans involving fixed sized allocations of spectrum per channel, each at an assigned center wavelength. Each channel is thus reserved or allocated a specific portion of the optical spectrum such that multiple channels may be transmitted simultaneously through a fiber optical strand or other medium, including free space, thus providing an information carrying capacity.

Channel schemes which employ fixed spectral width allocations may lead to inefficient use of the available spectrum. High data rate channels may, for example, require a larger amount of spectrum while lower rate channels may be able to employ smaller amounts of spectrum. In this mixed rate environment, employing adaptable or variable spectral width allocations instead of fixed spectral width allocations may improve spectrum efficiency. One technique for this is proposed by Jinno, et al in "Spectrum-Efficient and Scalable Elastic Optical Path Network: Architecture. Benefits. and Enabling Technologies" included herein by reference. This improves spectral efficiency by avoiding unused portions within fixed spectral width allocations.

However, this variable spectral width allocation scheme, or any allocation scheme that uses variable sized allocations in a contiguous spectral range per channel can lead to the case where unallocated spectrum may become interspersed with allocated spectrum leading to "stranded" spectrum. That is, aggregation(s) of unallocated spectrum may be sufficient to handle additional allocation demands, but fragmentation may mean that there is no adequate contiguous portion. This reduces the spectrum utilization. When initially planning and deploying a channel plan for a given optical path, the operator will attempt to allocate spectrum for channels such that there is no stranded spectrum between channels: keeping unallocated spectrum contiguous. However, as a client moves channels to alternate optical paths, or changes capacity requirements on any given channel in the optical path, stranded spectrum becomes a real problem. As shown in FIG. 1, spectrum allocations may vary and unallocated spectrum may not be contiguous. For example, the spectrum allocation amounts shown by 123, 101, and 112 each differ, and the unallocated portions of spectrum indicated by 131, 132, 133 and 134 arc not contiguous. Although the cumulative amount of unallocated spectrum 131 through 134 inclusive is equivalent to the allocation assigned in 123, they are not contiguous, and it would not be possible to allocate those portions as shown to a single channel with spectrum needs similar to those allocated to region 123.

If multiple portions of unallocated spectrum are re-arranged so that they collectively form a larger contiguous spectrum, such contiguous spectrum may be allocated to meet a demand, in which case those portions are said to be "recovered".

The need to recover stranded spectrum may also exist when other techniques are used to improve spectrum utilization. For example, Orthogonal Frequency Division Multiplexing (OFDM) may improve spectrum utilization by increasing the amount of information which may be transported using a given quantity of spectrum, and perhaps allow the spectral widths of channels to vary, but that technique itself does nothing to recover stranded spectrum. Likewise, the use of techniques such as modulation formats and polarization division multiplexing may improve the efficiency of spectrum utilization, but they do not inherently recover stranded spectrum.

Since the amount of usable spectrum is typically limited, it is important to use that spectrum efficiently. Therefore, it is desirable to provide methods and systems for collecting unallocated spectrum into larger contiguous ranges thereby recovering this wasted but valuable resource.

BRIEF SUMMARY OF THE INVENTION

The primary objective of the present invention is to provide methods and systems for the recovery of optical spectrum.

One objective of the invention is to provide a first method for moving a channel to a targeted spectral location between the origin of a channel and one or more terminations of the channel thereby aggregating unallocated spectrum.

Another objective of the invention is to provide a system capable of executing the first method of moving a channel to a targeted spectral location.

Another objective of the invention is to provide a second method for moving a first channel to a targeted spectral location thereby aggregating unallocated spectrum by temporarily using a second channel during the movement of the first channel.

Another objective of the invention is to provide a system capable of executing the second method of moving a channel to a targeted spectral location by using a temporary second channel during the movement of the first channel.

Another objective of the invention is to provide a third method for aggregating unallocated spectrum by temporarily using a second channel while abolishing and then re-establishing a first channel, where the spectral properties of the first channel differ before it is abolished versus after it is re-established.

Another objective of the invention is to provide a system capable of executing the third method of aggregating unallocated spectrum by temporarily using a second channel while abolishing and then re-establishing a first channel, where the spectral properties of the first channel differ before it is abolished versus after it is re-established.

The present invention uses various embodiments to re-arrange allocations of optical spectrum. In embodiments in accordance with the invention, re-arrangement of optical spectrum allocations is achieved by moving the spectral range of one or more channels within the spectrum.

Consistent with the foregoing objectives, and in accordance with the invention described herein broadly and through the use of various embodiments, methods and systems are disclosed in sufficient detail to allow one of ordinary skill in the art to practice the invention.

As may be apparent from the embodiments disclosed herein, the invention offers several advantages over the prior art. The invention allows for the rearrangement of spectrum and hence the recovery of unallocated portions into larger contiguous portions in a manner which may not require the traffic carried by the channels which are rearranged to be interrupted during the rearrangement process. Further, the invention may be realized through the inventive arrangement and control disclosed herein using components already in common use in optical communication systems. It should also be apparent to one skilled in the art that the inventive method and system is not limited to spectrum recovery but can be used whenever optical spectrum needs to be rearranged. Other advantages may also be apparent, especially in certain specific cases where the invention may offer further advantages over the prior art.

BRIEF DESCRIPTION OF THE SEVERAL VIEWS OF THE DRAWINGS

FIGS. 6a through 6c depict an example embodiment of a system capable of executing the first method depicted in FIG. 3.

FIG. 7 depicts a second method of moving a first channel from one spectral location to a targeted spectral location using an alternate second channel during the move of the first channel.

FIG. 10 depicts a third method of aggregating unallocated spectrum by temporarily using a second channel while abolishing and then re-establishing a first channel, where the spectral properties of the first channel differ before it is abolished versus after it is re-established.

FIG. 8 and FIG. 9 are further used to depict example embodiments of systems capable of executing the method depicted in FIG. 10.

DETAILED DESCRIPTION OF THE INVENTION

Figure 1:
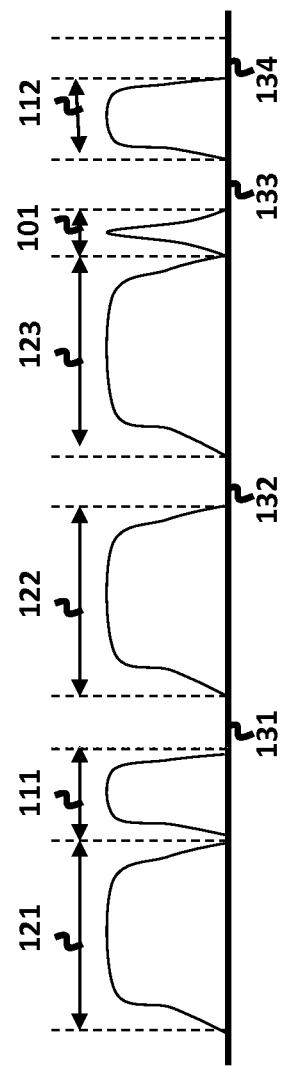
FIG. 1 is a frequency domain graph of several signals, each of which occupies a different region of the spectrum and depicting the fragmentation of unallocated spectrum leading to wasted and stranded spectrum.

The present invention will now be described more fully, using a subset of its embodiments. Additional embodiments will be apparent to those skilled in the art and are covered by the claims of the invention.

Optical communications systems transmit optical signals from an optical origination point to one or more optical termination points. These optical signals may be modulated in some fashion in order to carry information. An optical signal may be characterized by its center frequency, state(s) of polarization and its spectral width. The minimum portion of the optical spectrum required by a given system to be allocated for the conveyance of a given optical signal from an origin to one or more termination(s) is referred to as an optical channel, which is often, in context, simply referred to as a channel. More specifically, allocation refers to one or more portions of optical spectrum reserved for the channel and within which the system must constrain the optical signal. This includes the spectral range based upon the width of the optical signal, and may also include spectral ranges on either or both sides of the optical signal. The minimum portion of optical spectrum allocation required for operation of a given channel may be determined by a number of factors, including the stability of the optical carrier source, the modulation format and rate, the relative state(s) of polarization of the signal, the properties of the medium and devices through which the channel will pass and the distance over which the channel will travel.

An optical channel originates at a point where its characteristic optical properties are established. Any device or component alone or in combination capable of generating an optical signal that can be modified or manipulated and which connects to one or more other points can serve as an originator. For example, the output of an optical transmitter which employs a laser, optionally using a modulation method to impart information content to the optical carrier generated by the laser, may be an origin of an optical channel and is referred to as an originator. Other (non-exhaustive) examples of devices which may constitute in whole or in part an originator include multi-wavelength lasers, multi-line lasers, tunable lasers, tunable LEDs, SOAs or VCSEL arrays, polarization splitters, and modulators. An optical channel may be said to terminate where its optical spectrum properties are terminated or modified. Any device, component or combination of both capable of detecting an optical signal for the purpose of decoding conveyed information from an originator can serve as a terminator. For example, an optical receiver may be such a point and is referred to as a termination. Other (non-exhaustive) examples of devices which may constitute in whole or in part a terminator include polarization combiners, photo-detectors, photo-conductors, photo-transistors, photodiodes, broadband receivers and coherent receivers.

Similarly, a point at which the spectral region occupied by an optical signal is moved by, for example, a wavelength shift apparatus, may be considered an terminator from the perspective of the input signal or an originator from the perspective of the output signal of the channel using the shifted portion of spectrum. The input or output of the wavelength shift apparatus may be considered a termination or origination point, respectively, since the optical characteristics of the signal differ after that corresponding point.

Shifting refers to the movement of an optical channel within a reserved spectral range. Shifting can be done using a continuous movement from one frequency range to another frequency range, by using one or more discrete steps, by changing the spectral width of the channel or by changing the state(s) of polarization of the channel. For convenience, we will discuss shifting of a channel by reference to changes in the location of the channel, but such references are intended to include any combination of one or more of the channel spectral property changes listed.

Figure 2A:
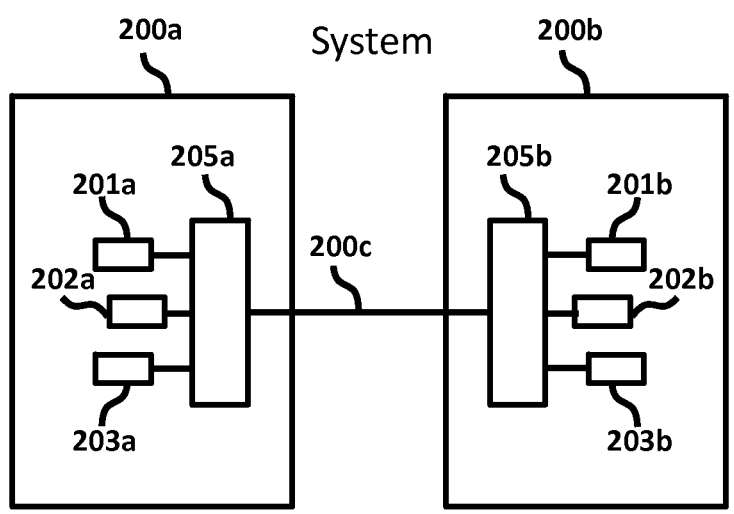
FIGS. 2a and 2b depict the mapping of channels between the origins and terminations and their corresponding optical signals and spectrum allocations.
Figure 2B:
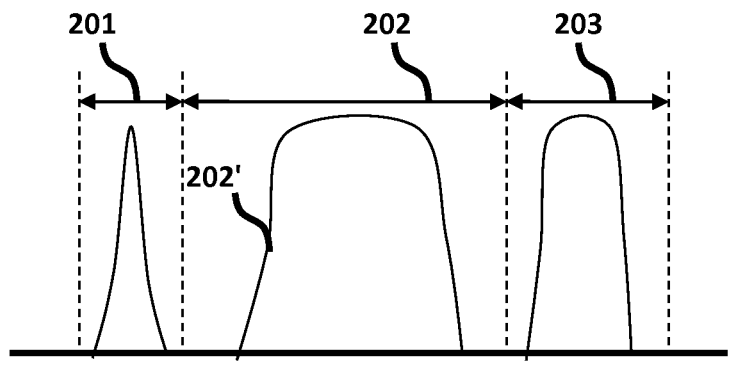

FIGS. 2a and 2b depict an example mapping of channels between two nodes which include originators and terminators as well as the optical spectrum associated with each channel. The term 'node' is not meant to convey any particular type of partitioning or limitation of the invention. Rather, the term is used in a general sense to mean the set of functions enclosed within the designated box of a figure or drawing. Later drawings and descriptions will show different node structures all consistent with the invention. In FIG. 2a, node 200a contains originators 201a, 202a and 203a and an optical multiplexer 205a. The multiplexer couples the signal from each originator to optical medium 200c. In our example the medium is an optical fiber. The corresponding terminators 201b, 202b and 203b and de-multiplexer 205b are shown in node 200b. The de-multiplexer decouples, or separates the three signals received from fiber 200c and directs each corresponding signal to its corresponding terminator. FIG. 2b shows the initial allocation for each channel. As can be seen there are different allocation spectrum positions and widths for each channel shown. Channel allocations are depicted in 201, 202 and 203 while 202' depicts the corresponding optical signal for 202. The spectral allocation for a channel does not necessarily match the spectral width of the optical signal.

Any two channels travelling through a medium together may be separated by intervening optical spectrum which is not allocated to any channel. Such intervening optical spectrum will herein be referred to as unallocated spectrum. Even if an aggregation of such unallocated spectrum were adequate for the spectral needs of a channel, it is not possible to allocate such portions to that channel if they are not spectrally contiguous.

In order to achieve the maximum utilization of available optical spectrum in an optical communication system, it is therefore advantageous to provide a method and system which allows such unallocated spectrum to be re-arranged, or de-fragmented, so that one or more larger contiguous spectral ranges may be formed. For example, if two unallocated spectral ranges, each of which account for an optical frequency range of 25 GHz are re-arranged so that they are spectrally adjacent, the combined spectral range would be equivalent to an optical frequency range of 50 GHz. If there is a demand for a spectral region spanning 50 GHz of optical frequency range in order to transport an additional channel, such a re-arrangement would enable the allocation of this spectral region to that channel.

Figure 3:
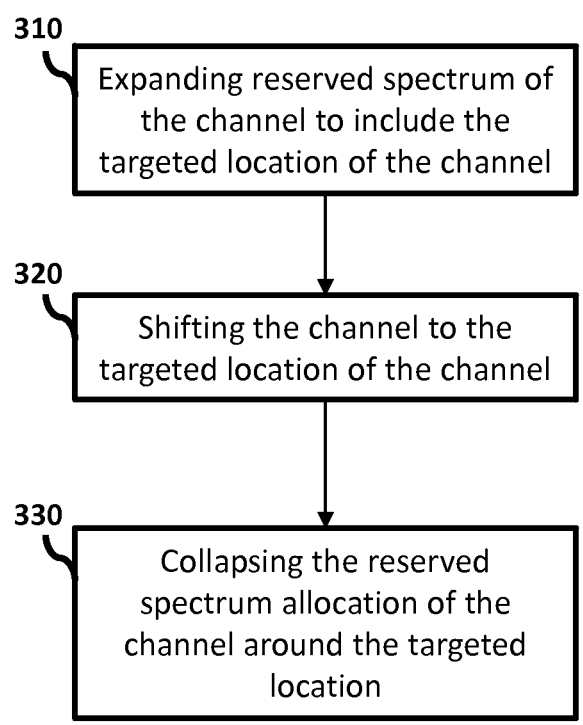
FIG. 3 depicts a first method of moving a channel from one spectral region to another spectral region.

FIG. 3 depicts a flow chart of a first method for moving a channel from its initial allocated region to its targeted allocated region. Without affecting the transmission of the service using an optical signal for the channel, the reserved optical spectrum around the given channel is expanded in the direction of the targeted movement of the channel such that enough space is reserved at the targeted spectral location for the operation of the channel. This expansion of reserved spectrum consists of one or more regions of spectrum and within which the channel is constrained. Once the reserved spectrum is so enlarged, step 320 requires a shift of the channel to a targeted spectral location. In many cases, shifting of the channel will not be service affecting. In cases where the shift may be service affecting, it may be minimized. Step 330 then reduces the reserved spectrum around the channel at its targeted spectral location to meet the minimum portion of optical spectrum allocation required for operation of the channel. In most cases the size of this allocation will be equal to the size of the initial allocation of the channel before the move. These three steps have the effect of moving the channel to another location thereby defragmenting the unallocated spectrum.

Figure 4A:
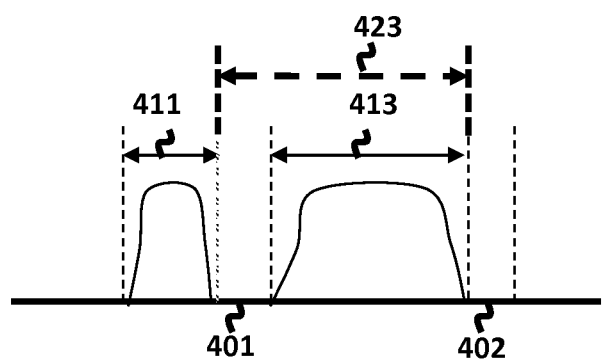
FIGS. 4a through 4c depict an example of moving the spectral location of a channel to a different location using the steps of the first method depicted in FIG. 3 when there are no intervening allocated spectral regions between the starting and targeted spectral regions of the channel.
Figure 4B:
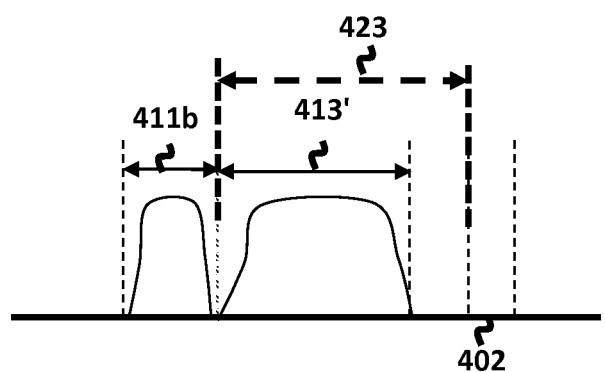
Figure 4C:
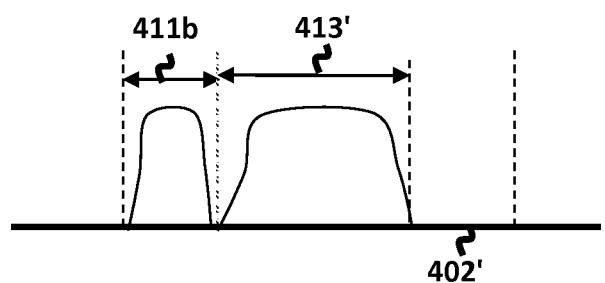

An example of the effects upon spectrum allocations of the above method steps 310, 320 and 330 of FIG. 3 is depicted in corresponding FIGS. 4a, 4b and 4c. FIG. 4a, depicts the spectral effects following the expansion of the reserved spectrum of channel 413. The spectral allocation for channel 413 is adjacent to unallocated spectra 401 and 402. The expansion of reserved spectrum for channel 413 is depicted as 423. This expansion includes the allocated region of channel 413. is in the direction of 401, and without overlap, abuts the allocation for channel 411. FIG. 4b shows the result 413' after channel 413 is shifted into the region previously depicted as unallocated spectrum 401. FIG. 4c shows the result after the expanded reserved spectrum 423 for the shifted channel 413' in FIG. 4b is collapsed to that equal to the channel allocation of 413'. In our example, this reduction is equal to the original allocation width of channel 413 of FIG. 4a. This process had two effects: moving the allocation of channel 413 in FIG. 4a to allocation of channel 413' in FIG. 4c, and moving an unallocated portion of spectrum equivalent in size to that of unallocated spectrum 401 of FIG. 4a so that it is adjacent to and abutting the unallocated spectrum 402, forming a larger contiguous unallocated spectrum 402' shown in FIG. 4c.

Those skilled in the art will recognize that the means by which the channel is shifted may vary. For example, the frequency range of the optical signal may be adjusted by temperature tuning of a thermally controlled laser, by using an optical frequency shifter, by adjusting optical cavity or material properties of a laser, by selection of a different optical carrier source, by adjustment of a wavelength locker, either alone or in combination with other mechanisms, or by any similar methods which cause a shift in the optical carrier of the channel.

Alternatively, the shifting of the channel may occur between regions of channel allocations which are not contiguous. That is, the expansion of the reserved allocation may involve unallocated spectrum which is not adjacent to the channel. Unallocated spectrum of sufficient spectral width to contain the channel at a different spectral location is reserved for the channel. The channel is then changed to the targeted spectral location, and the initial allocated spectrum of the channel is then released.

For example, a tunable XFP device such as a JDSU JXP01TMAC1CC5GEN may be used as both an origin and as a termination. This device integrates a tunable optical laser source, a Mach-Zehnder Interferometer based modulator and a wavelength locker which together constitute an optical transmitter capable of fulfilling the role of an origin. By altering the programmed settings of the device through its serial interface from an associated microprocessor, which forms a part of the local controller, shifting of the channel is achieved by changing the programmed value of the channel at which the device operates. As this device employs an optical receiver which is receptive to the entire range over which the transmitter portion is able to operate, the receiver portion is able to meet the needs of a corresponding termination point consistent with the requirements of the origin met by the transmitter portion.

Figure 5A:
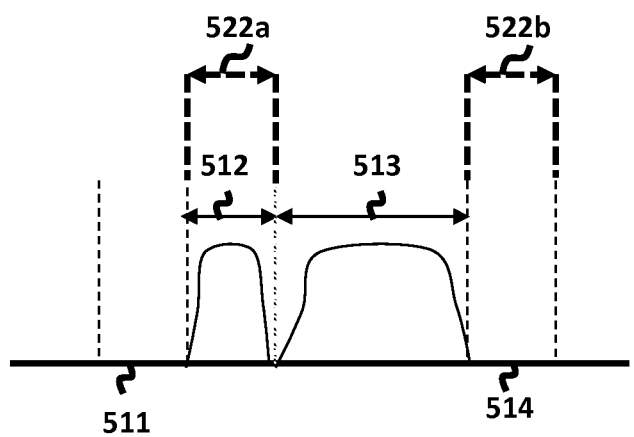
FIGS. 5a through 5c depicts an example of moving the spectral location of a channel to a different location using the steps of the first method depicted in FIG. 3 when there are intervening allocated spectral regions between the starting and targeted spectral regions of the channel.
Figure 5B:
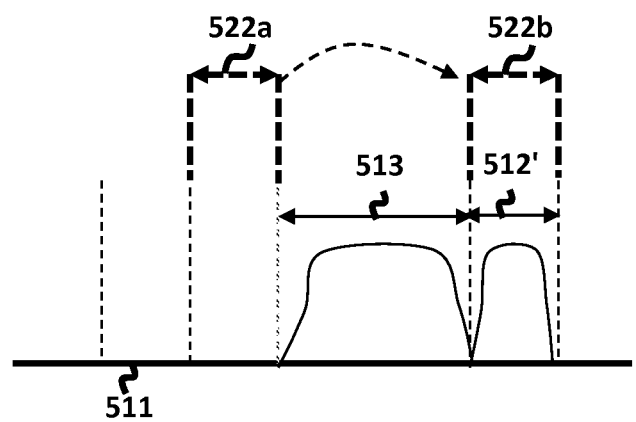
Figure 5C:
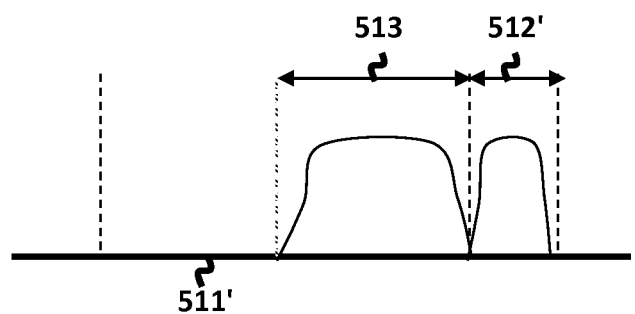

A second spectrum change example of the process steps 310, 320 and 330 of FIG. 3 which uses a non-contiguous expansion of reserved spectrum for a given channel and a non-contiguous, or stepwise. shifting of the channel is depicted in FIGS. 5a, 5b and 5c. In FIG. 5a, the spectral allocation for channel 512 is adjacent to allocated spectrum 513 and the targeted shift is located at unallocated spectrum 514. The non-contiguous expansion of reserved spectrum for channel 512 is depicted as 522a and 522b, 522b must be of sufficient size to meet the needs of the channel with the initial allocation depicted by 512, and in this example is at least as large as the spectrum of 512. The channel must remain constrained within these non-contiguous regions and shifting cannot interfere with channel 513. FIG. 5b shows the result as channel 512' after channel 512 is shifted stepwise, or non-contiguously, into the region previously occupied by unallocated spectrum 514. FIG. 5c shows the result after the non-contiguous reserved spectrum 522a and 522b for channel 512' in FIG. 5b is collapsed to that equal to the channel allocation of 512'. In our example, this reduction is equal to the original allocation width of channel 512 of FIG. 5a. This has the effect of combining the unallocated portion of spectrum 511 with the previous allocated spectrum 512 of FIG. 5a. It also has the effect of moving channel 512 to location 512'.

During the shifting, the channel is constrained within its reserved spectral region. When the expanded reserved spectral region is contiguous, the channel may move by any amount and at any rate, provided it remains within the reserved region. When the expanded reserved spectral region is not contiguous and there are one or more spectral regions which the movement of the channel must avoid, the manner in which the channel moves may be limited. That is, it will require one or more discrete steps to avoid interference with other allocated channels.

It will be apparent to those skilled in the art that the optical signal within the channel may be interrupted for some period of time if the method by which it is moved would require the optical carrier to be suppressed during this adjustment. It is therefore advantageous in this embodiment to employ an optical carrier source which offers as rapid a change of spectral movement as possible, and preferably to employ devices capable of performing the needed optical signal shifts nearly instantaneously. It is further advantageous for the terminators of the channel to be insensitive to the spectral range of the channel (e.g. broadband receiver), or to have a nearly instantaneous ability to adjust to such a change of the optical signal.

Figure 6A:
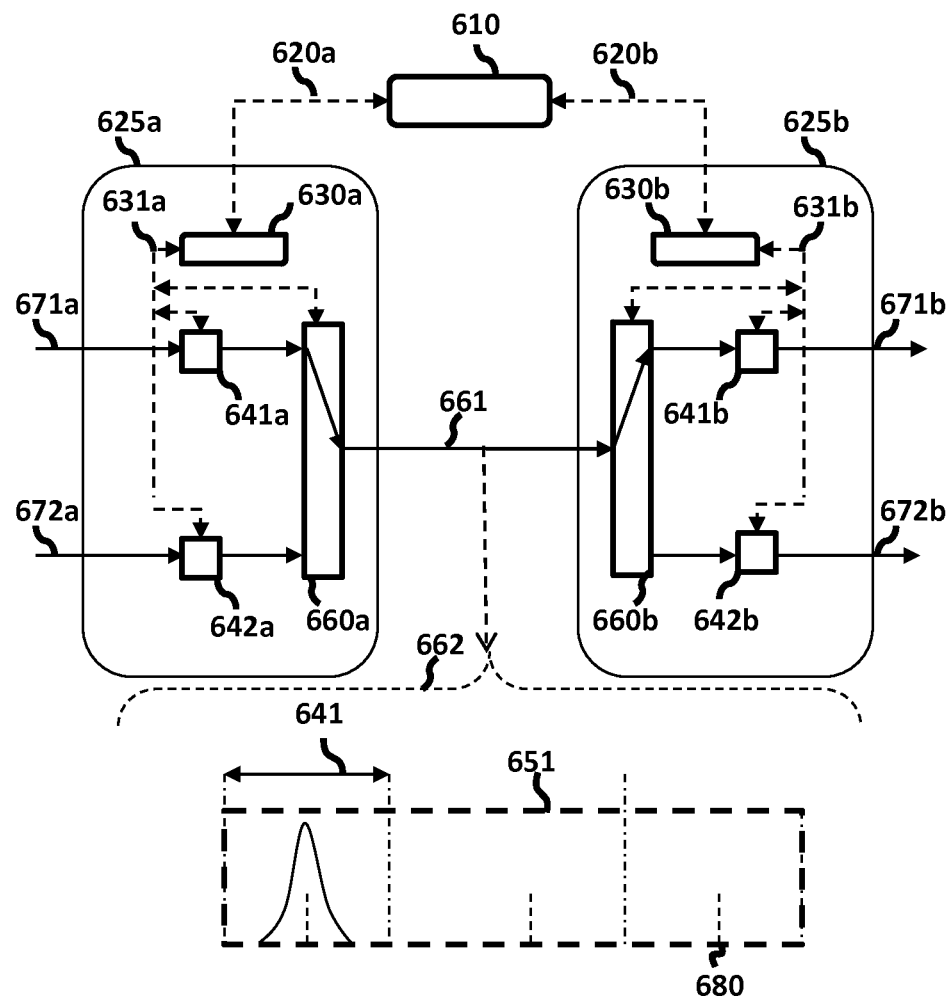

FIGS. 6a, 6b and 6c show an example system embodiment which performs process steps 310, 320 and 330 of FIG. 3. FIG. 6a shows a controller 610 which is used to configure and control a system of devices, or nodes, capable of expanding reserved spectrum for a given channel, shifting the channel to another location and then collapsing the channel's reserved spectrum. This controller 610 typically has complete knowledge of the channel assignment plan between originators and terminators. This includes the spectrum allocation of each channel as well as the unallocated spectrum on the complete path between any given originator/terminator pair. This controller may be a Network Management System (NMS) or an Element Management System (EMS) or any such controlling hardware, software or combination of hardware and software used to control the system. The system is composed of devices that are connected by a medium 661 and that are capable of conveying optical signals. In our embodiment controller 610 is connected by optical, electrical or wireless mediums 620a and 620b to corresponding local controllers 630a and 630b at corresponding nodes 625a and 625b. Under the control of an operator, controller 610 will generally issue commands and respond to messages to and from one or more local controllers for the purpose of configuring, maintaining and changing the spectral properties of an optical channel and expanding and collapsing reserved spectrum around a channel as depicted in the process identified in FIG. 3.

Local controllers are composed of hardware, software or any combination of hardware and software and are generally used to control originators, terminators and/or other devices within a node. Controller 630a is connected by control path 631a to originators 641a through 642a, and to an optical multiplexer 660a. In some cases the originator may be a tunable transmitter capable of generating an optical signal having a center frequency, or range of one or more frequency slot(s), and a spectral width determined by the stability of the optical carrier source, one or more state(s) of polarization, the modulation format and rate, the properties of the medium and devices through which the channel will pass, and the distance over which the channel will travel. The center wavelength, or frequency slot(s), for a tunable transmitter can typically be assigned from across a wide frequency range. Controller 630a generally controls each originator to operate at a specific spectral range and to have a channel allocation as specified by controller 610. The optical multiplexer 660a connects the path between the originator and the transmission fiber 661. The optical multiplexer may or may not contain one or more devices or components, alone or in combination, that are capable of being controlled or tuned to alter the flow of optical signals based upon their spectral properties.

At node 625b, controller 630b is connected by control path 631b to terminators 641b through 642b, and connected to an optical de-multiplexer or de-coupler 660b. The de-multiplexer 660b separates the individual channels received from the optical fiber 661 and directs the optical signal for each channel to its corresponding terminator. The optical de-multiplexer may or may not contain one or more devices or components, alone or in combination, that are capable of being controlled or tuned to alter the direction of flow of optical signals based upon the spectral properties of the optical signal.

Input signals 671a through 672a are connected to corresponding originators 641a through 642a. Output signals 671b through 672b are connected to corresponding terminators 641b through 642b. The input and output signals are typically conveyed as optical or electrical signals.

Medium 661 conveys optical signals between nodes based upon specific channel assignment and channel allocation. For the purposes of our example, optical signals and channel allocations are shown in 662. The channel plan 662 contains a single channel with an initial spectral allocation 641. Channel 641 is conveyed between originator 641a and terminator 641b. The rest of the spectral map of 622 is un-allocated spectrum with location 680 the targeted location for the move of channel 641.

FIG. 6a shows the expanded reserved spectrum of channel 641 to that of 651 covering location 680. This expanded allocation includes all spectrum needed for the proper operation of the channel as it shifts to its new location. In the preferred embodiment this is initiated by the centralized controller 610 issuing a request message to local controller 630a to expand the spectral reservation for channel 641 to that depicted as 651. If the multiplexer 660a is capable of being controlled to alter the flow of optical signals based upon the frequency range of the signals then controller 630a must configure the multiplexer 660a to convey the spectral range depicted as 651 from 641a to fiber 661. Centralized controller 610 also issues a message to local controller 630b to expand the reserved spectrum of channel 641. Since our embodiment contains a broadband receiver capable of receiving a wide band of frequencies, specific control of the receiver is not necessary. If the de-multiplexer 660b is capable of being controlled to alter the flow of optical signals based upon the frequency range of the signals then controller 630b must configure the de-multiplexer 660b to convey the spectral range depicted as 651 from fiber 661 to terminator 641b. Once the expansion of reserved spectrum of channel 641 is complete at each node, the corresponding local controllers send a request complete response to central controller 610. When central controller 610 receives a request complete response from both local controllers, the central controller 610 will initiate the action to shift the optical signal over to the targeted location 680.

FIG. 6b shows the shift of channel 641 to channel location 641'. Centralized controller 610 issues a request to local controller 630a to shift channel 641 to the spectral location designated as 641'. Local controller 630a then uses control path 631a to transmitter 641a to shift the optical signal to channel 641' using the reserved spectrum space 651. In our preferred embodiment, tunable transmitter 641a is thermally controlled to shift the optical signal of channel 641 to the center frequency or frequency slot of channel 641'. When the tunable transmitter has shifted the signal to its requested location, the local controller uses the control path 631a to lock the transmitter on to the center wavelength or frequency slot(s) of channel 641'.

FIG. 6c shows the collapse of the reserved spectrum to the required spectrum at channel 641'. Central controller 610 issues requests to local controllers 630a and 630b to collapse the spectrum allocation to the spectrum depicted as 641'. Local controller 630a will control transmitter 641a to operate within the scope of 641' as well as the multiplexer 660a. Local controller 630b will control the de-multiplexer 660b to this same spectrum range. Since the receiver in our example embodiment is a broadband receiver there is no adjustment local controller 630b must make at the receiver 641b.

An alternative approach to moving the channel is issuing a single request from central controller 610 to either local controller 630a or 630b to initiate the full sequence of steps listed above. For example, local controller 630a could receive a request from central controller 610 that includes information of the channel to move, the properties of the expanded allocation, the properties of the targeted location and the properties of the channel after the move is done. Local controller 630a will perform its local operation as well as pass the request on to all intermediate devices along the channel path between the originator/terminator pair. The request to all intermediate devices may, for example, be passed using an optical supervisory channel: a special frequency range used to pass control information along the channel transmission path. Responses from all intermediate local controllers will be received at controller 630a. Once complete, controller 630a will send a request complete response back to the central controller 610. The level of information and number of requests passed back and forth between the central controller and one or more local controllers may vary while remaining consistent with the method of the invention.

Another alternative for moving a channel to different location is that of initiating the request from a local controller without the support of central controller 610 at all. There are many alternative embodiments to control the moving of a channel to another location which are still consistent with the method and system of the invention described above.

FIG. 7 is a flow chart depicting a second method for moving a channel from one location to another location. Step 710 uses a switching function to switch from a first channel to a second channel used as a temporary path during the move in spectral location of the first channel. Step 720 expands the reserved optical spectrum of the first channel to include the targeted location of the channel move. Step 730 shifts the first channel to the targeted location. Step 740 collapses the reserved optical spectrum of the first channel around the targeted location. Step 750 switches from the second channel back to the first channel at its new spectral location.

Figure 8:
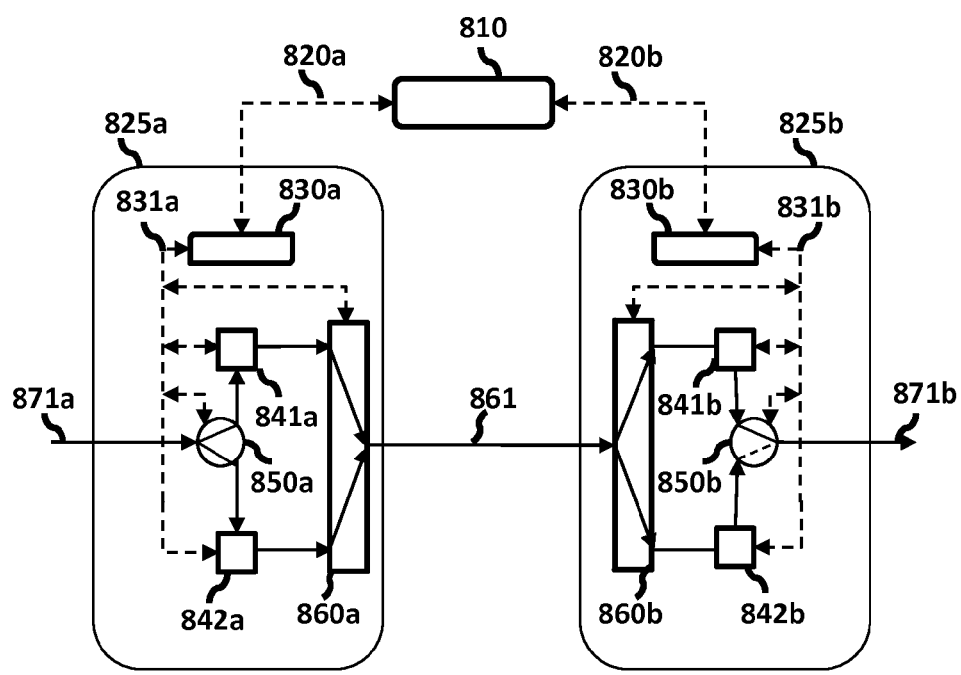
FIG. 8 depicts a first example embodiment of a system capable of executing the method depicted in FIG. 7 and using redundant transmitters and receivers conveying the signals over a single fiber.

FIG. 8 depicts an example embodiment of a system capable of moving a channel from one location to another location using the method depicted in FIG. 7. In this example embodiment, the move of the channel from one location to another location temporarily uses a second channel whose optical multiplexer 860a, transmission medium 861 (e.g. fiber) and de-multiplexer 860b are shared, thereby restricting the spectral properties of the first channel to be different than that of the second channel.

Input signal 871a is connected to bridge 850a in node 825a. Bridge 850a is connected to originators 841a and 842a. The switch 850b, under the control of local controller 830b using control path 831b, is used as a selector to choose between a first channel including originator 841a and terminator 841b and a second channel including originator 842a and terminator 842b, these two channels having different spectral properties. Originators 841a and 842a modulate their respective optical signals to encode input signal 871a and transmit these signals to optical multiplexer/coupler 860a. Coupler 860a couples the signals of the first channel and the second channel onto fiber 861. At node 825b the de-multiplexer 860b de-couples, or separates out each channel and delivers the signal in the optical spectral range of the first channel along the path to terminator 841b and delivers the signal in the optical spectral range of the second channel along the path to terminator 842b. Terminators 841b and 842b are connected to the switch/selector 850b. Selector 850b is controlled by local controller 830b using path 831b to choose a path for output signal 871b from among the first channel using terminator 841b or the second channel using terminator 842b. Terminators 841b and 842b demodulate the signals carried via the two channels and transmit them to selector 850b. In our current embodiment the initial selection for output signal 871b is that from 841b.

The switching function of step 710 of FIG. 7 is accomplished by changing the selector 850b to select the second channel. This is typically under the control of central controller 810 issuing requests to local controllers 830b. Local controller 830b controls the selection of the channel conveying output signal 871b using control path 831b.

The next step 720 is to expand the optical spectral range of the first channel to include the targeted spectral location of the move. Assuming that the de-multiplexer is a controllable device capable of selectively altering the flow of optical signals based upon the spectral range of the channels, the de-multiplexer will need to be tuned to deliver each corresponding channel to the correct terminator. In the current embodiment this is done at node 825b and de-multiplexer 860b. In our example, the central controller 810 issues a request of local controller 830b to expand the spectral range of frequencies delivered from fiber 861 to terminator 841b to include, at a minimum, the optical spectral range of the targeted location. The local controller executes the change at de-multiplexer 860b and notifies central controller 810 of its completion.

Once the optical spectral range of the first channel has been expanded, the central controller 810 issues a request to local controller 830a to shift the optical carrier of originator 841a to the targeted frequency location as specified in step 730. Local controller 841a is shifted under the control of local controller 830a using control path 831a. When the spectral range of originator 841a reaches its targeted spectral location the local controller 830a notifies central controller 810 of the completed request.

The next step is to collapse the optical spectral range of the first channel around the spectral range of the targeted location as specified in step 740 of FIG. 7. This has the effect of returning to un-allocated spectrum any reserved range no longer needed by the first channel after it has been moved to its targeted location. In the current embodiment, this is done by central controller 810 issuing a request to local controller 830b to reduce the spectral range through the de-multiplexer 860b for the first channel. Local controller 830b using control path 831*b* controls the optical de-multiplexer 860*b* to reduce the spectral range of the first channels signal around that of the targeted location. Once completed, local controller 830*b* notifies central controller 810 of the completed request.

Once the collapsing function request is complete, the central controller 810 issues a request to local controller 830*b* to switch the selector 850*b* back to the first channel using termination 841*b*. The local controller 830*b* using control path 831*b* controls the change in selector 850*b* to switch from the second channel to the first channel as specified in step 750 of FIG. 7.

Performing step 720 before step 710 of FIG. 7 is also consistent with the inventive method. FIG. 3 and FIGS. 6*a* through 6*c* describe a system capable of moving a channel without the use of a second channel, which therefore shows that expansion does not require a selector or a switch to a second channel. However, when a second channel is utilized as a part of the method a selector and switching function is needed, either before the expansion or after the expansion. Performing step 750 before step 740 is also consistent with the inventive method depicted in FIG. 7, however, steps 710 and 720 must both occur before step 730 and steps 740 and 750 must both be done after step 730.

As described earlier with respect to FIGS. 6*a* through 6*c*, the use of a centralized controller 810 is not required as the necessary control may be achieved via the local controller(s). Nor does the inventive method or system require that each local controller be controlled independently. These functions could be initiated by a single controller which sends requests to the other local controller(s) to perform their required functions and send back request complete message(s) when the requested action(s) has(have) been completed.

In addition, and entirely consistent with the claimed invention, the bridge 850*a* could be replaced by a switch which is controlled to convey input signal 871*a* selectively to either originator 841*a* or originator 842*a* when the output signal 871*b* is to be derived from the first or second channels, respectively. Also, switch 850*b* may be replaced by a coupler if the choice of the first or second channel is achieved by arranging only one of the two optical channels to be active at any point in time. This may be achieved by employing a bridge as 850*a* and by selective control of originators 841*a* and 842*a*, or by using a switch as 850*a* as well as selective control of originators 841*a* and 842*a*, or by any equivalent means.

In fact, any means of achieving a selection of either the first channel or the second channel as the channel which would allow a signal to be conveyed from one point to another should the signal exist is consistent with the claimed invention. The means of achieving such a selection need not involve elements beyond the boundaries of the channels. For example, if 850*a* is a bridge and 850*b* is also a bridge, the selection may be achieved by appropriate operation of the devices supporting the first and second channels. One example is that the originators of the first and second channels, 841*a* and 841*b* respectively, may be controlled so that they are active at mutually exclusive times, thus having the effect that at most one of the two channels is active at any point in time. Another example is that the terminators 841*b* and 842*b* may likewise be controlled so that they are active at mutually exclusive times, thus achieving the desired selection. Additional examples may include, without limitation, the use of devices at 860*a* and/or 860*b* which allow control to select at most one of the two channels signals to pass at any point in time. It is also possible to employ the above selection mechanisms in combination while remaining consistent with the claimed invention. Any means by which the selection described herein may be realized is intended to be covered by the invention.

Figure 9:
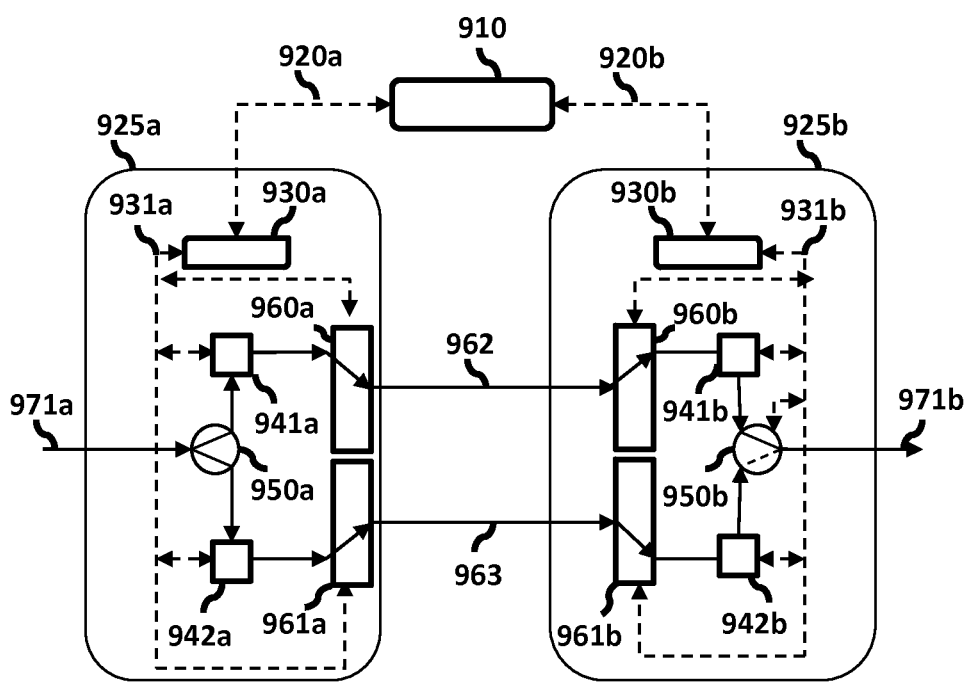
FIG. 9 depicts a second example embodiment of a system capable of executing the method depicted in FIG. 7 and using redundant transmitters and receivers but conveying their corresponding signals over separate fibers.

FIG. 9 depicts another example embodiment of a system capable of moving a channel from one location to another location using the method depicted in FIG. 7. In this example embodiment, the move of the first channel temporarily involves a second channel where there are no system components which are shared between these two channels other than possibly control components.

The primary difference between FIG. 8 and FIG. 9 is the use of completely independent resources of the optical multiplexers. the medium (e.g. fibers) and de-multiplexers between the first channel and the second channel.

The path between originator and terminator for the first channel follows originator 941*a*, multiplexer 960*a*, fiber 962, de-multiplexer 960*b* and terminator 941*b*. The path between originator and terminator for the second channel follows originator 942*a*, multiplexer 961*a*, fiber 963, de-multiplexer 961*b* and terminator 942*b*. As can be seen, there are no common elements among the first and second channels. This means there are no restrictions on the spectral properties of the first or second channel other than system range restrictions.

Step 710 is done by local controller 930*b* using control path 931*b* to switch selector 950*b* to derive output signal 971*b* from the second channel termination 942*b*. Step 720 expands the spectral range of the first channel by widening the spectral signal from originator 941*a* through multiplexer 960*a* and fiber 962 through de-multiplexer 960*b* to terminator 941*b* to include at a minimum the spectral range of the targeted channel location for the first channel. Step 730 shifts the optical carrier of the first channel at 941*a* to the optical frequency range of the targeted location. Step 740 collapses the spectral range of the first channel around the targeted spectral range after the channel's optical carrier has moved to the targeted location. Step 750 causes the selection of the output signal to revert back to the first channel by changing the selector 950*b* to pass the signal from terminator 941*b*.

As in the description of the example embodiment of FIG. 8, the same variations on the need for and use of the central controller, local controllers, bridge and/or selector devices, and the mechanisms for selection of the first or second channel also apply to this example embodiment.

In both the example embodiment of FIG. 8 and FIG. 9 the optical path between an originator/terminator pair may also contain intermediate devices (not shown) that may be involved as part of the overall system. These intermediate nodes may require tuning of local devices to ensure that only reserved spectrum is passed through without interference from other channels on a given fiber link. This ability may in many cases use an optical supervisory channel to pass control messages between the central controller and/or local controllers along the path and in some cases for controlling local devices to ensure correct signal processing.

An example of an intermediate device is an optical amplifier. In cases where an amplifier is an EDFA amplifier, it is likely that no changes are needed during the control operations in terms of operation of the amplifier. In cases where an amplifier uses Raman amplification, then it may be necessary to compensate for a change of channel assignment with a corresponding, shift of pumps during the channel shifting process of a given originator/terminator pair transiting the Raman amplifier, and therefore changes by means of control of the amplifier may be necessary. Another example of an intermediate device may be Optical Add/Drop Multiplexers (OADMs) that need to ensure that dropped or added channels at the OADM location do not interfere with changes in the assignment, allocation and shifting of optical signals for a given channel. These examples are illustrative in nature and should not be taken as limitations of the claimed invention—any one or more devices which may be employed along the path of one or more channels and which do not cause termination of the channel are intended to be covered within the scope of the claimed invention.

FIG. 10 is a flow chart depicting a third method for aggregating unallocated spectrum. Step 1010 uses a switching function to switch from a first channel to a second channel used as a temporary path during the subsequent steps of abolishing and re-establishing the first channel. Step 1020 abolishes the first channel. Step 1030 re-establishes the first channel with the targeted spectral properties, those properties differing from the properties of the first channel prior to when it was abolished in step 1020. This has the effect of altering the spectral properties of the first channel and also of modifying the properties of the unallocated spectrum. Step 1040, which is optional, switches from the second channel back to the first channel with its new spectral properties.

FIG. 8 is now re-used to depict an example embodiment of a system capable of executing the method depicted in FIG. 10. In this example embodiment, the optical multiplexer 860*a*, transmission medium 861 (e.g. fiber) and de-multiplexer 860*b* are shared by the first and second channels, thereby restricting the spectral properties of the first channel to be different than those of the second channel.

Input signal 871*a* is connected to bridge 850*a* in node 825*a*. Bridge 850*a* is connected to originators 841*a* and 842*a*. The switch 850*b*, wider the control of local controller 830*b* using control path 831*b*, is used as a selector to choose between a first channel including originator 841*a* and terminator 841*b* and a second channel including originator 842*a* and terminator 842*b*, these two channels having different spectral properties. Originators 841*a* and 842*a* modulate their respective optical signals to encode input signal 871*a* and transmit these signals to optical multiplexer/coupler 860*a*. Coupler 860*a* couples the signals of the first channel and the second channel onto fiber 861. At node 825*b* the de-multiplexer 860*b* de-couples, or separates out the spectral properties reserved for each channel and delivers the signal in the optical spectral range of the first channel along the path to terminator 841*b* and delivers the signal in the optical spectral range of the second channel along the path to terminator 842*b*. Terminators 841*b* and 842*b* are connected to the switch/selector 850*b*. Selector 850*b* is controlled by local controller 830*b* using path 831*b* to choose a path for output signal 871*b* from among the first channel using terminator 841*b* or the second channel using terminator 842*b*. Terminators 841*b* and 842*b* demodulate the signals carried via the two channels and transmit them to selector 850*b*. In our current embodiment the initial selection for output signal 871*b* is that from 841*b*.

The switching function of step 1010 of FIG. 10 is accomplished by changing the selector 850*b* to select the second channel. This is typically under the control of central controller 810 issuing requests to local controllers 830*b*. Local controller 830*b* controls the selection of the channel conveying output signal 871*b* using control path 831*b*.

The next step 1020 is to abolish the first channel. This is achieved by suppressing the optical carrier at originator 841*a* and releasing the spectrum reserved for the first channel so that it becomes unallocated spectrum at all points along the path of the first channel. In this embodiment, these changes are achieved by central controller 810 issuing requests to local controller 830*a* which in turn communicates to originator 841*a* and multiplexer 860*a* over control path 831*a*, and also by central controller 810 issuing requests to local controller 830*b* which in turn communicates to terminator 841*b* and de-multiplexer 860*b* over control path 831*b*, and further, by central controller **810* receiving responses to said requests so that it is aware of the point at which the requests are completed.

The next step 1030 is to re-establish the first channel with spectral properties different than those the channel possessed prior to step 1020. This is achieved by assigning unallocated spectrum to the first channel and permitting the optical carrier at originator 841*a* to traverse the channel. These changes are achieved in a manner similar to that used to abolish the first channel in the preceding step. Central controller 810 issues requests to local controller 830*a* which in turn communicates to originator 841*a* and multiplexer 860*a* over control path 831*a*, and central controller 810 also issues requests to local controller 830*b* which in turn communicates to terminator 841*b* and de-multiplexer 860*b* over control path 831*b*. Central controller 810 receives responses to said requests so that it is aware of the point at which the requests are completed. The optical carrier from originator 841*a* is not permitted to traverse the channel until the unallocated spectrum has first been allocated to all other points along the channel.

The abolishing and re-establishing of the first channel changes both the spectral properties of the first channel and the spectral properties of the unallocated spectrum, achieving the goal of recovering unallocated spectrum. The central controller 810 may then optionally issue a request to local controller 830*b* to switch the selector 850*b* back to the first channel using termination 841*b*, consistent with optional method step 1040. The local controller 830*b* using control path 831*b* controls the change in selector 850*b* to switch from the second channel to the first channel as specified in step 1040 of FIG. 10.

As described earlier, the use of a centralized controller 810 is not required as the necessary control may be achieved via the local controller(s). Nor does the inventive method or system require that each local controller be controlled independently. These functions could be initiated by a single controller which sends requests to the other local controller(s) to perform their required functions and send back request complete message(s) when the requested action(s) has(have) been completed.

In addition, and entirely consistent with the claimed invention, the bridge 850*a* could be replaced by a switch which is controlled to convey input signal 871*a* selectively to either originator 841*a* or originator 842*a* when the output signal 871*b* is to be derived from the first or second channels, respectively. Also, switch 850*b* may be replaced by a coupler if the choice of the first or second channel is achieved by arranging only one of the two optical channels to be active at any point in time. This may be achieved by employing a bridge as 850*a* and by selective control of originators 841*a* and 842*a*, or by using a switch as 850*a* as well as selective control of originators 841*a* and 842*a*, or by any equivalent means.

In fact, any means of achieving a selection of either the first channel or the second channel as the channel which would allow a signal to be conveyed from one point to another should the signal exist is consistent with the claimed invention. The means of achieving such a selection need not involve elements beyond the boundaries of the channels. For example, if 850*a* is a bridge and 850*b* is also a bridge, the selection may be achieved by appropriate operation of the devices supporting the first and second channels. One example is that the originators of the first and second channels, 841*a* and 841*b* respectively, may be controlled so that they are active at mutually exclusive times, thus having the effect that at most one of the two channels is active at any point in time. Another example is that the terminators 841b and 842b may likewise be controlled so that they are active at mutually exclusive times, thus achieving the desired selection. Additional examples may include, without limitation, the use of devices at 860a and/or 860b which allow control to select at most one of the two channels signals to pass at any point in time. It is also possible to employ the above selection mechanisms in combination while remaining consistent with the claimed invention. Any means by which the selection described herein may be realized is intended to be covered by the invention.

FIG. 9 is now also re-used to depict another example embodiment of a system capable of moving a channel from one location to another location using the method depicted in FIG. 10. In this example embodiment, the abolishing and re-establishing of the first channel occurs after switching from the first channel to the second channel and prior to any optional switch from the second channel to the re-established first channel. The primary difference between FIG. 8 and FIG. 9 is the use of completely independent resources of the optical multiplexers, the medium (e.g. fibers) and de-multiplexers between the first channel and the second channel.

The path between originator and terminator for the first channel follows originator 941a, multiplexer 960a, fiber 962, dc-multiplexer 960b and terminator 941b. The path between originator and terminator for the second channel follows originator 942a, multiplexer 961a, fiber 963, de-multiplexer 961b and terminator 942b. As can be seen, there are no common elements among the first and second channels. This means there are no restrictions on the spectral properties of the first or second channel other than system range restrictions.

Step 1010 is done by local controller 930b using control path 931b to switch selector 950b to derive output signal 971b from the second channel termination 942b. The next step 1020 is to abolish the first channel. This is achieved by suppressing the optical carrier at originator 941a and releasing the spectrum reserved for the first channel so that it becomes unallocated spectrum at all points along the path of the first channel. In this embodiment, these changes are achieved by central controller 910 issuing requests to local controller 930a which in turn communicates to originator 941a and multiplexer 960a over control path 931a, and also by central controller 910 issuing requests to local controller 930b which in turn communicates to terminator 941b and de-multiplexer 960b over control path 931b, and further, by central controller 910 receiving responses to said requests so that it is aware of the point at which the requests are completed.

The next step 1030 is to re-establish the first channel with spectral properties different than those the channel possessed prior to step 1020. This is achieved by assigning unallocated spectrum to the first channel and permitting the optical carrier at originator 941a to traverse the channel. These changes are achieved in a manner similar to that used to abolish the first channel in the preceding step. Central controller 910 issues requests to local controller 930a which in turn communicates to originator 941a and multiplexer 960a over control path 931a, and central controller 910 also issues requests to local controller 930b which in turn communicates to terminator 941b and de-multiplexer 960b over control path 931b. Central controller 910 receives responses to said requests so that it is aware of the point at which the requests are completed. The optical carrier from originator 941a is not permitted to traverse the channel until the unallocated spectrum has first been allocated to all other points along the channel.

The abolishing and re-establishing of the first channel changes both the spectral properties of the first channel and the spectral properties of the unallocated spectrum, achieving the goal of recovering unallocated spectrum. The central controller 910 may then optionally issue a request to local controller 930b to switch the selector 950b back to the first channel using termination 941b, consistent with optional method step 1040. The local controller 930b using control path 931b controls the change in selector 950b to switch from the second channel to the first channel as specified in step 1040 of FIG. 10.

As in the description of the example embodiment of FIG. 8 as it applies to the method depicted in FIG. 10, the same variations on the need for and use of the central controller, local controllers, bridge and/or selector devices, and the mechanisms for selection of the first or second channel also apply to this example embodiment.

In both the example embodiment of FIG. 8 and FIG. 9 as they apply to the method depicted in FIG. 10 the optical path between an originator/terminator pair may also contain intermediate devices (not shown) that may be involved as part of the overall system. These intermediate nodes may require tuning of local devices to ensure that only reserved spectrum is passed through without interference from other channels on a given fiber link. This ability may in many cases use an optical supervisory channel to pass control messages between the central controller and/or local controllers along the path and in some cases for controlling local devices to ensure correct signal processing.

An example of an intermediate device is an optical amplifier. In cases where an amplifier is an EDFA amplifier, it is likely that no changes are needed during the control operations in terms of operation of the amplifier. In cases where an amplifier uses Raman amplification, then it may be necessary to compensate for a change of channel assignment with a corresponding shift of pumps during the channel shifting process of a given originator/terminator pair transiting the Raman amplifier, and therefore changes by means of control of the amplifier may be necessary. Another example of an intermediate device may be Optical Add/Drop Multiplexers (OADMs) that need to ensure that dropped or added channels at the OADM location do not interfere with changes in the assignment, allocation and shifting of optical signals for a given channel. These examples are illustrative in nature and should not be taken as limitations of the claimed invention—any one or more devices which may be employed along the path of one or more channels and which do not cause termination of the channel are intended to be covered within the scope of the claimed invention.

Those skilled in the art will appreciate that various changes and modifications may be made to the embodiments without departing from the spirit or scope of the invention. It is intended that such changes and modifications be included within the scope of the invention. Further, it is intended that the invention not be limited to the embodiments described herein, nor to those changes and modifications apparent as of the filing date of this application. It is intended that the invention be limited in scope only by the appended claims.

We claim:

1. A method for changing at least one of the optical frequency range and/or states of polarization of an optical allocation of an optical channel from an initial allocation to a target allocation without tearing down said optical channel and without changing the spectral width of an optical signal within said optical channel, comprising:

expanding a reservation of said optical allocation from said initial allocation to at least said initial allocation and said target allocation, shifting said optical allocation within the expanded said reservation from said initial allocation to said target allocation, and collapsing the expanded said reservation to equal said target allocation.

2. A method for changing the optical allocation of an optical channel as in claim 1, wherein the expanded said reservation occupies a single contiguous range.

3. A method for changing the optical allocation of an optical channel as in claim 1, wherein the expanded said reservation occupies two or more spectral ranges which are non-contiguous with respect to each other.

4. A method for changing the optical allocation of an optical channel as in claim 1, wherein said shifting of said optical allocation occurs in one or more increments.

5. A method for changing the optical allocation of an optical channel as in claim 1, wherein said shifting of said optical allocation occurs without interrupting the flow of information conveyed via said optical channel.

6. A system for changing at least one of the optical frequency range and/or states of polarization of an optical allocation of an optical channel from an initial allocation to a target allocation without tearing down said optical channel and without changing the spectral width of an optical signal within said optical channel, comprising:

an origination point device capable of generating said optical signal, a terminating point device optically coupled to said origination point device and capable of terminating said optical signal, and one or more controllers coupled to said origination point device and to said termination point device collectively operable for expanding a reservation of said optical allocation from said initial allocation to at least said initial allocation and said target allocation, shifting said optical allocation within the expanded said reservation from said initial allocation to said target allocation, and collapsing the expanded said reservation to equal said target allocation.

7. A system for changing the optical allocation of an optical channel as in claim 6, wherein said origination point device is optically coupled to said termination point device via at least one optical coupling device, wherein said at least one optical coupling device includes at least one of either an optical switch, a reconfigurable optical add-drop multiplexer, or an optical amplifier, and said one or more controllers coupled to said at least one optical coupling device.

\* \* \* \* \*